March 8, 1927. 1,620,153
R. CURTNER
CUTTER
Filed Aug. 26, 1925
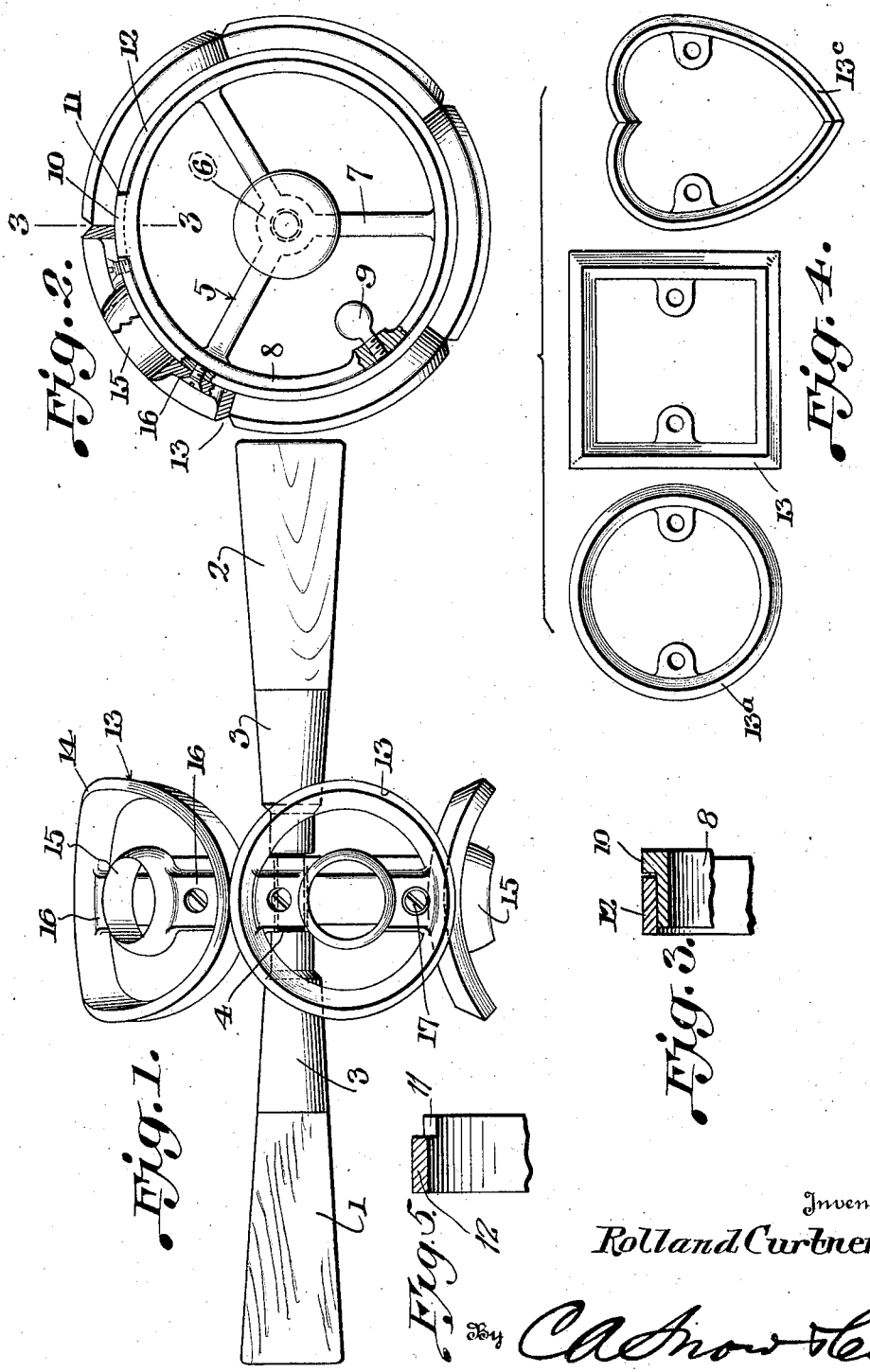
Inventor
Rolland Curtner
By C.A.Snow&Co
Attorney Patented Mar. 8, 1927.

1,620,153

UNITED STATES PATENT OFFICE.

ROLLAND CURTNER, OF MARION, INDIANA.

CUTTER.

Application filed August 26, 1925. Serial No. 52,641.

This invention relates to a cutter for cookies, biscuits, fancy cakes and the like.

The object of the invention is to provide a rotatable device having a plurality of interchangeable cutters carried thereby so that when turned, a plurality of cakes or cookies will be cut out with one rolling of the device in a manner similar to the use of a rolling pin.

With the foregoing and other objects in view which will apear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a cutter constructed in accordance with this invention;

Figure 2 is an end elevation with parts broken out and in section;

Figure 3 is a detail sectional view taken on the line 3—3 of Figure 2; and

Figure 4 is a front elevation showing several of the interchangeable cutters used with the device.

Figure 5 is a fragmental sectional view of the rim and band.

In the embodiment illustrated, two handle members 1 and 2 are shown having ferrules 3 at their inner ends, said ends being connected by a shaft 4 on which is mounted to rotate a wheel 5 which has a hub 6 substantially filling the space between the ferrules 3 and which is loose enough to turn freely on the shaft. This wheel 5 has spokes 7 radiating from its hub and secured at their outer ends to a rim or felly 8 and through which extends a set screw 9 for a purpose presently to be described.

Projecting radially from the outer face of the rim 8 at one edge thereof is a lug 10 which is designed to fit a corresponding notch 11 formed in one edge of the tire or band 12. The tire or band 12 is detachably mounted on the rim 8 by means of the lug 10 entering the recess 11 in said tire and by the screwing up of the thumb screw 9. Detachably mounted on the tire 12 are a plurality of cutters 13 any desired number of which may be employed and which may be of any desired size or configuration. Five of these cutters are here shown applied and as shown in Figures 1 and 2 they are made substantially annular with a beveled cutting edge 14 on the outer face. This ring-shaped cutter is provided with a concentric smaller ring 15 also equipped with a sharp cutting edge and which is connected with the outer member by cross arms 16 apertured to receive attaching screws 17 whereby they are detachably secured to the tire or band 12.

The cutting edges of these ring-shaped members are made concaved so that when applied they will combine to form a continuous cutting device which when turned in the manner of a rolling pin will cut out the individual cakes or cookies.

In Figure 4 a plurality of cutters 13$^a$, 13$^b$ and 13$^c$ are shown of different configuration which may be substituted for those shown in Figures 1 and 2 by simply unscrewing the screw 17 and applying the cutter shown in Figure 2 in the place thereof. These interchangeable cutters, provide for the formation of cakes of different shapes in a single operation since obviously round, square, heart-shaped or other shaped cutters may be carried by the same rim.

I claim:—

In a device of the character described, a supporting shaft, a wheel mounted for rotation on the shaft, a band adapted to be positioned on the wheel, means for removably securing the band to the wheel, a plurality of cutting members, each of said cutting members having a bar formed with an opening, the openings in the bars adapted to receive securing screws to removably secure the cutters to the bars, and handles for operating the device.

In testimony that I claim the foregoing as my own, I have hereto affixed my signature.

ROLLAND CURTNER.